United States Patent

[11] 3,627,789

[72] Inventors Georg Anner
Basel;
Peter Wieland, Oberwil/BL, both of Switzerland
[21] Appl. No. 781,273
[22] Filed Dec. 4, 1968
[45] Patented Dec. 14, 1971
[73] Assignee CIBA Corporation
Summit, N.J.
[32] Priority Dec. 8, 1967
[33] Switzerland
[31] 17253/67

[54] 3-OXO-STEROID-OXIMES
7 Claims, No Drawings
[52] U.S. Cl..................................................260/397.45,
260/239.5, 260/239.55, 260/999
[51] Int. Cl..........................................................C07c 169/34
[50] Field of Search............................................/Machine
Searched Steroids

[56] References Cited
UNITED STATES PATENTS
3,019,242 1/1962 Wechter........................ 260/397.5

3,061,618 10/1962 Wechter et al. ............... 260/397.45

Primary Examiner—Henry A. French
Attorneys—Harry Goldsmith, Joseph G. Kolodny, Bryant W. Brennan and Edward J. Sites ABSTRACT: 3-oxasteroid-oximes of the formula:

(I)

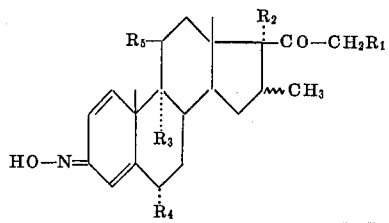

in which $R_1$ represents a free, esterified or etherified hydroxyl group, $R_2$ a free or esterified hydroxyl group, $R_3$ and $R_4$ a hydrogen or fluorine atom each and $R_5$ represents a hydroxyl or oxo group, and at least one of the substituents $R_3$ or $R_4$ must be fluorine and the 16-methyl group may be α- or β-positioned, are compounds showing a good anti-inflammatory activity. They are prepared by oximation of corresponding 3-oxo compounds.

3-OXO-STEROID-OXIMES

DESCRIPTION OF THE PREFERRED EMBODIMENTS

In the new compounds of the invention the said esterified hydroxyl groups are above all derived from organic carboxylic acids of the aliphatic, alicyclic, aromatic or heterocyclic series, especially those containing one to 18 carbon atoms, for example formic, acetic, propionic, a butyric acid, a valeric acid such as n-valeric acid, or trimethylacetic, trifluoroacetic, a caproic acid such as β-trimethylpropionic or diethylacetic acid, oenanthic, caprylic, pelargonic, capric acid, an undecylic acid, for example undecylenic acid, lauric, myristic, palmitic or a stearic acid, for example oleic acid, or a cyclopropane-, -butane-, -pentane- or -hexane-carboxylic acid, for example, cyclopropylmethanecarboxylic, cyclobutylmethancarboxylic, cyclopentylethanecarboxylic, cyclohexylethanecarboxylic, benzoic acid, a phenoxyalkane acid such as phenoxyacetic acid, a dicarboxylic acid such as succinic, phthalic, quinolic, furan-2-carboxylic, 5-tertiary butyl-furan-2-carboxylic, 5-bromo-furan-carboxylic, nicotinic or isonicotinic acid, or of sulfonic acids such as benzenesulfonic acids, or of inorganic acids such, for example, as phosphoric or sulfuric acids.

An etherified hydroxyl group is more especially one derived from an alcohol containing one to eight carbon atoms, for example from a lower aliphatic alkanol such as ethanol, methanol, propanol, isopropanol, a butyl or amyl alcohol or from an araliphatic alcohol, especially from a monocyclic aryl-lower aliphatic alcohol such as benzyl alcohol, or from a heterocyclic alcohol, such as α-tetrahydropyranol or -furanol.

Special mention deserve the 3-oximes of $\Delta^{1,4}$-9α-fluoro-16α-methyl-11β,17α,21-tirhydroxy-3,20-dioxopregnadiene, $\Delta^{1,4}$-9α-fluoro-16β-methyl-11β,17α,21-trihydroxy-3,20-dioxopregnadiene, $\Delta^{1,4}$-6α-fluoro-16α-methyl-11β,17α,21-trihydroxy-3,20-dioxopregnadiene and $\Delta^{1,4}$-6α,9α-difluoro-16α-methyl-11β,17α,21-trihydroxy-3,20-dioxopregnadiene and their esters, especially the 21-monoesters with one of the acids mentioned above, more especially the acetates, propionates, trimethylacetates or caproates and the corresponding 11-ketones.

The new compounds of the above formula (I) possess valuable pharmacological properties; inter alia, they display especially an antiinflammatory and thymolytic activity, displaying a significant degree of dissociation between peripheral and central effects. The new compounds are also valuable intermediates for the manufacture of other useful substances, especially of pharmacologically active compounds.

The compounds of the formula (I) may be prepared in known manner. More especially, they may be manufactured from the corresponding 3-oxo compounds by oximation in known manner, only the oxo group in position 3 being selectively converted into the oxime. There is used, for example, hydroxylamine in the form of a salt, such as the hydrochloride or acetate, preferably in excess, and the oximation is carried out in a suitable solvent, for example in pyridine, at room temperature. The time taken by the reaction depends on the starting steroid used: In the case of the derivatives that are not fluorinated in position 9 the reaction takes a long time, for example 2 to 3 days, whereas with the 9-fluorosteroids the reaction time is surprisingly substantially shorter.

Any esterified or etherified hydroxyl groups in a resulting steroid-3-oxime can be liberated in known manner by mild alkaline or acid hydrolysis.

Thus, the process for the manufacture of the new 3-oxo-steroid-oximes of this invention is characterized in that a steroid of the formula (II)
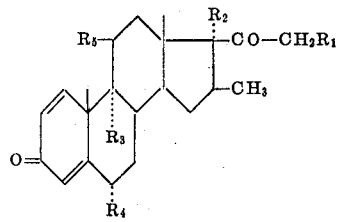

in which $R_1$ to $R_5$ have the same meanings as in formula (I), are oximated in position 3 and, if desired, esterified or etherified hydroxyl groups in the resulting 3-oxime are liberated.

The compounds to be used as starting materials are known or, if new, they can be manufactured in known manner. Preferred starting materials are those which give rise to the specific compounds specially mentioned above.

The present invention includes also the manufacture of pharmaceutical preparations for use in human and veterinary medicine that contain the new pharmacologically active substances of the invention described above as active ingredients in admixture or conjunction with a pharmaceutical excipient. Suitable excipients are organic or inorganic substances suitable for enteral, for example oral, parenteral or local administration. The excipients may be formed from substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, for example tablets, dragees or capsules, or in liquid or semiliquid form solutions, suspensions, emulsions, ointments or creams. The pharmaceutical preparations may be sterilized and/or contain assistants such as preserving, stabilizing, wetting or emulsifying agents, salts for regulating the osmotic pressure or buffers. They may also contain further therapeutically valuable substances. The new compounds may also be used as starting products for the manufacture of other valuable compounds.

The compounds of the present invention may also be used as additives to animal fodders.

The following examples illustrate the invention.

EXAMPLE 1

A solution of 4 g. of $\Delta^{1,4}$-6α-fluoro-16α-methyl-11β,17α,21-trihydroxy-3,20-dioxopregnadiene-21-acetate in 400 ml. of pyridine is mixed with 4 g. of hydroxylamine hydrochloride and left to itself for 65 hours at room temperature, then poured into ice water, extracted with ether and the ethereal solution is washed with dilute hydrochloric acid and then with water, dried and evaporated, to yield 3 g. of the crude 3-oxime of $\Delta^{1,4}$-6α-fluoro-16α-methyl-11β,17α,21-trihydroxy-3,20-dioxopregnadiene-21-acetate which, after recrystallization from aqueous methanol, melts at 238°–242° C. with decomposition.

In a similar manner $\Delta^{1,4}$-6α,9α-difluoro-16α-methyl-11β,17α,21-trihydroxy-3,20-dioxopregnadiene-21-acetate yields after 24 hours' reaction the corresponding 3-oxime which, after recrystallization from ether, melts at 229°–232° C. with decomposition.

The reaction of the 11-ketones corresponding to the above-mentioned starting materials with hydroxylamine hydrochloride is performed in an analogous manner, to furnish the 3-oxime of $\Delta^{1,4}$-6α-fluoro-16α-methyl-17α,21-dihydroxy-3,11,20-trioxopregnadiene-21-acetate and, respectively, the 3-oxime of $\Delta^{1,4}$-6α,9α-difluoro-16α-methyl-17α,21-dihydroxy-3,11,20-trioxopregnadiene-21-acetate.

EXAMPLE 2

A solution of 4 g. of $\Delta^{1,4}$-9α-fluoro-16α-methyl-11β,17α,21-trihydroxy-3,20-dioxopregnadiene-21-trimethylacetate in 400 ml. of pyridine is allowed to react for 65 hours at room temperature with 4 g. of hydroxylamine hydrochloride, and the batch is then worked up as described in example 1. Recrystallization of the residue from methylenechloride furnishes the 3-oxime of $\Delta^{1,4}$-9α-fluoro-16α-methyl-11β,17α,21-trihydroxy-3,20-dioxopregnadiene-21-trimethylacetate which melts at 264°–266° C. with decomposition.

An analogous reaction of $\Delta^{1,4}$-6α,9α-difluoro-16α-methyl-11β,17α,21-trihydroxy-3,20-dioxopregnadiene-21-trimethylacetate for 23 hours with hydroxylamine hydrochloride furnishes the corresponding oxime which solidifies with toluene in gel form. Filtration through a column of silica gel and crystallization from ether+petroleum ether furnishes crystals melting at 239°–240° C. with decomposition.

The 21-esters described in examples 1 and 2 can be hydrolyzed in known manner to furnish the corresponding 21-hydroxy compound, for example with sodium or potassium bicarbonate in an aqueous alcoholic solution.

EXAMPLE 3

In a manner analogous to that described in example 1, $\Delta^{1,4}$-9α-fluoro-16α-methyl-11β,17α-dihydroxy-21-methoxy-3,20-dioxopregnadiene of melting point of 262°–264° C. is reacted with hydroxylamine hydrochloride to obtain the amorphous 3-oxime of $\Delta^{1,4}$-9α-fluoro-16α-methyl-11β17α-dihydroxy-21-methoxy-3,20-dioxopregnadiene.

We claim:

1. A compound of the formula

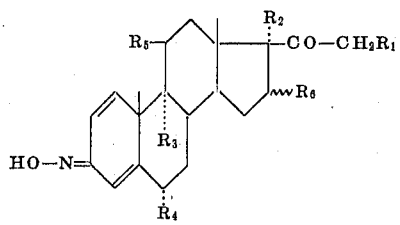

wherein $R_1$ is a member selected from the group consisting of a free, an esterified and an etherified hydroxyl group, $R_2$ a member selected from the group consisting of a free and an esterified hydroxyl group, $R_3$ and $R_4$ each a member selected from the group consisting of hydrogen and fluorine at least one of $R_3$ and $R_4$ being fluorine and $R_5$ a member selected from the group consisting of a hydroxyl group and an oxo group and $R_6$ a member selected from the group consisting of an α- and a β-methyl group, each of said esterified hydroxyl groups being derived from a member selected from the group consisting of a carboxylic acid having one to 18 carbon atoms, a sulfonic acid, a phosphoric acid and a sulfuric acid, and each of said etherified hydroxyl groups being derived from a member selected from the group consisting of an alcohol which is aliphatic or araliphatic hydrocarbon except for the alcoholic hydroxyl group, α-tetrahydropyranol and α-tetrahydrofuranol.

2. A compound as claimed in claim 1, wherein any esterified hydroxyl group is derived from carboxylic acid having from one to 18 carbon atoms.

3. A compound as claimed in claim 1, wherein any etherified hydroxyl group is derived from a member selected from an alcohol containing from one to eight carbon atoms.

4. A compound as claimed in claim 1, selected from the group consisting of the 3oxime of the $\Delta^{1,4}$-9α-fluoro-16α-methyl-11β,17α,21-trihydroxy-3,20-dioxopregnadiene and of the $\Delta^{1,4}$9α-fluoro-16β-methyl-11β,17α,21-trihydroxy-3,20-dioxpregnadiene and their 21-lower aliphatic carboxylic acid esters.

5. A compound as claimed in claim 1, selected from the group consisting of the 3-oxime of the $\Delta^{1,4}$-6α-fluoro-16α-methyl-11β,17α,21-trihydroxy-3,20-dioxopregnadiene and the $\Delta^{1,4}$-6α,9α-difluoro-16α-methyl-11β,17α,21-trihydroxy-3,20-pregnadiene and the lower aliphatic carboxylic acid esters.

6. A compound as claimed in claim 1, selected from the group consisting of the 3-oxime of the $\Delta^{1,4}$9α-fluoro-16α-methyl-17α,21-dihydroxy-3,11,20-trioxopregnadiene and of the $\Delta^{1,4}$-9α-fluoro-16β-methyl-17α,21-dihydroxy-3,11,20-trioxopregnadiene and their 21-lower aliphatic carboxylic acid esters.

7. A compound as claimed in claim 1, selected from the group consisting of the 3-oxime of the $\Delta^{1,4}$-6α-fluoro-16 α-methyl-17α,21-dihydroxy-3,11,20-trioxpregnadiene and the $\Delta^{1,4}$-6α,9α-difluoro-6α-methyl-17α,21-dihydroxy-3,11,20-trioxopregnadiene and their lower aliphatic carboxylic acid esters.

* * * * *

CASE 6334/E

UNITED STATES PATENT OFFICE
CERTIFICATE OF CORRECTION

PO-1050 (5/69)

Patent No. 3,627,789    Dated December 14, 1971

Inventor(s) GEORG ANNER ET AL

It is certified that error appears in the above-identified patent and that said Letters Patent are hereby corrected as shown below:

Column 4, line 34, change "trioxpregnadiene" to read --- trioxopregnadiene ---; line 35, before "methyl" delete "6α" and insert --- 16α ---.

Signed and sealed this 13th day of June 1972.

(SEAL)
Attest:

EDWARD M. FLETCHER, JR.
Attesting Officer

ROBERT GOTTSCHALK
Commissioner of Patents